(No Model.)
O. POUND.
CLAMP FOR HOSE COUPLINGS.
No. 593,906. Patented Nov. 16, 1897.
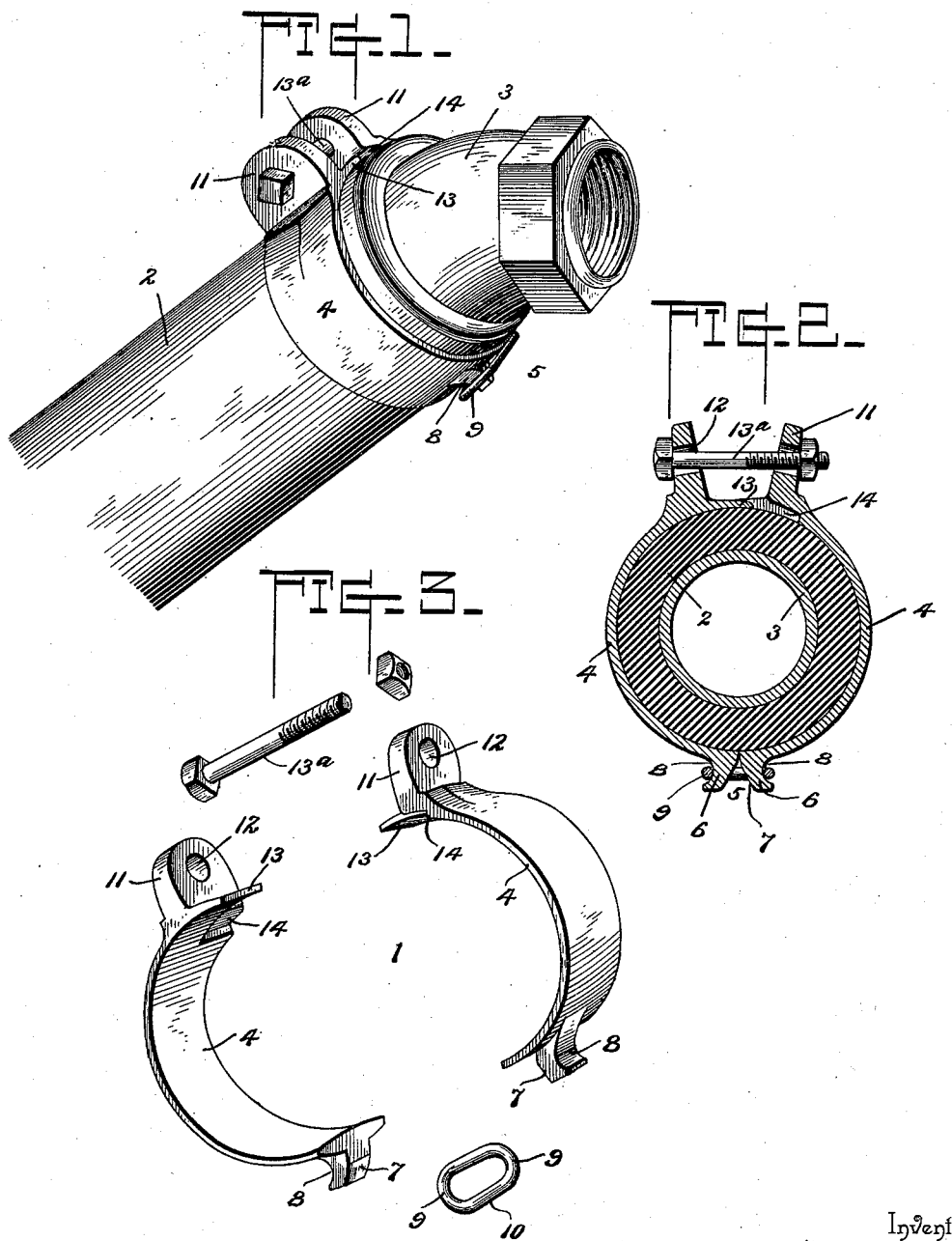
Witnesses
Inventor
Orange Pound,
By his Attorneys,
C.A. Snow & Co.

UNITED STATES PATENT OFFICE.

ORANGE POUND, OF BARTOW, FLORIDA.

CLAMP FOR HOSE-COUPLINGS.

SPECIFICATION forming part of Letters Patent No. 593,906, dated November 16, 1897.

Application filed July 28, 1896. Serial No. 600,836. (No model.)

*To all whom it may concern:*

Be it known that I, ORANGE POUND, a citizen of the United States, residing at Bartow, in the county of Polk and State of Florida, have invented a new and useful Clamp for Hose-Couplings, of which the following is a specification.

This invention relates to clamps for hose-couplings; and it has for its object to provide a clamp of this character especially adapted for use in connection with air, signal, water, gas, and other hose-couplings.

To this end the main and primary object of the invention is to provide a hose-coupling clamp having a wide range of adjustment for hose and couplings varying in size and thickness, while at the same time having means for placing the same clamping-pressure on all parts of the hose, so that the wear on the hose will be uniform and the life thereof greatly prolonged; and in the accomplishment of these objects the invention also contemplates a clamp that will readily adapt itself to inequalities in the hose and is readily separable and assembled in replacing old hose or in clamping new hose onto its coupling.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a hose-coupling having fitted thereon a clamp constructed in accordance with this invention. Fig. 2 is a cross-sectional view of the coupling with the clamp applied thereto, the clamp being illustrated as applied to the largest size of hose to which the same can be adapted. Fig. 3 is a detail in perspective of the clamp, showing the several parts thereof separated.

Referring to the accompanying drawings, the numeral 1 designates a hose-clamp of that character especially designed for clamping a hose 2 onto a coupling 3 to provide a perfectly tight joint between the hose and its coupling. The clamp 1 essentially comprises a pair of opposite duplicate semicircular clamp members 4, preferably formed of flat metal, so as to have a perfectly flat inner clamping-surface for the hose. The duplicate semicircular clamp members 4 are hinged together at one end, as at 5, and the contiguous hinged extremities of the clamp members 4 are provided with opposing offstanding hinge-lugs 6, arranged in the same circular plane and provided with inner convexed bearing-faces 7 and outer concaved faces or edges 8, which concaved faces or edges 8 detachably receive therein the looped ends 9 of the open coupling-link 10, which loosely connects the adjacent hinge-lugs 6 together and provides a loose hinge-joint for the coupling that obviates a pinching of the hose when the members are clamped together, and which is also very important in adapting itself to any inequalities in the hose, so that the clamp will adjust itself into firm contact with the hose when secured thereon. When the clamp is opened and closed, the convexed bearing-faces 7 ride on each other, and at the same time permit of the ready disengagement of the link 10 from the lugs 6 in removing the clamp.

The semicircular clamp members 4 are provided at their terminals opposite the hinge-lugs 6 with the offstanding perforated bolt-ears 11, the perforations 12 of which ears receive the single clamping-bolt 13ª, which serves to connect the unhinged ends of the clamp members together and when tightened to securely bind such members on the hose. The clamp members 4 are further provided at their terminals having the ears 11 with narrowed binding-lips 13, projected on a curved line beyond the plane of the bolt-ears 11 and preferably formed of one-half the width of the clamp members themselves. The opposing binding-lips 13 are arranged in parallel circular planes, so as to overlap at their adjacent side edges in the interval between the bolt-ears 11 when the clamp members are closed onto the hose, and at one side of its binding-lip 13 each clamp member is provided in its inner face with a curved recess 14, adapted to receive the binding-lip 13 of the opposing clamp member, and since the recesses 14 extend inward from the bolt-ears 11 a wide range of adjustment is provided for the clamp.

In Fig. 2 of the drawings the clamp is illustrated as adapted to the larger size of hose in connection with which it is intended for use, and when adjusted to the larger size of hose there will be a comparatively wide interval between the bolt-ears 11; but by reason of the particular disposition of the binding-lips 13 said lips overlap at their adjacent side edges and serve to close the interval between the bolt-ears. This relation of the binding-lips is always maintained, and on smaller sizes of hose and couplings the said binding-lips will be drawn into the circularly-alined recesses 14, thereby securing a wide range of adjustment.

The binding-lips 13 exert a clamping pressure on that part of a hose between the bolt-ears 11, and thereby cause the clamp to exert the same clamping-pressure on all parts of the hose. Ordinarily in hose-clamps there is no binding-pressure on that portion of the hose left between the bolt-ears 11, and this allows this portion of the hose to pucker up and become exposed to the wearing action of water and air, which very quickly rots away the exposed unclamped portion of the hose. This disadvantage to ordinary hose-clamps is obviated by the lips 13, while said lips at the same time have no tendency to bite or pinch the hose therebetween.

Changes in the form, proportion, and the minor details of construction may be resorted to without departing from the principle or sacrificing any of the advantages of this invention.

Having thus described the invention, what is claimed, and desired to be secured by Letters Patent, is—

1. A clamp for hose-couplings, comprising a pair of opposite duplicate semicircular clamp members hinged together at one end and provided at their unhinged terminals with offstanding perforate bolt-ears, narrowed binding-lips projected on a curved line beyond the plane of the bolt-ears, and curved recesses formed in the inner faces at one side of said lips, the opposing binding-lips being arranged in parallel circular planes whereby each lip will work in the curved recess of the opposing clamp member, and a clamping-bolt detachably connecting said bolt-ears, substantially as set forth.

2. A separable clamp for hose-couplings, comprising a pair of duplicate semicircular clamp members provided at one end with opposing offstanding contacting hinge-lugs arranged in the same circular plane and having inner convexed bearing-faces and outer concaved faces or edges, an open coupling-link loosely and detachably connecting the adjacent hinge-lugs and permitting the clamp to adjust itself to inequalities in the hose, said inner convexed bearing-faces of the opposing lugs being adapted to ride in direct contact when the members are spread apart to permit the points of the lugs to approach and provide for the ready disengagement of the coupling-link therefrom, and a bolt detachably clamping the unhinged ends of the clamp members, substantially as set forth.

In testimony that I claim the foregoing as my own I have hereto affixed my signature in the presence of two witnesses.

ORANGE POUND.

Witnesses:
JOHN H. SIGGERS,
THEODORE DALTON.